United States Patent [19]
Kucharski et al.

[11] Patent Number: 5,934,448
[45] Date of Patent: *Aug. 10, 1999

[54] WIRE CONVEYOR BELT WITH TENSION TRANSFER

[75] Inventors: John Kucharski, Salisbury, Md.; Christopher D. Esterson, Seaford, Del.

[73] Assignee: Cambridge, Inc., Cambridge, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 08/662,412

[22] Filed: Jun. 10, 1996

[51] Int. Cl.$^6$ .................................................. B65G 17/06
[52] U.S. Cl. ............................................ 198/852; 198/778
[58] Field of Search .................................... 198/778, 831, 198/834, 852, 848

[56] References Cited

U.S. PATENT DOCUMENTS

| | | |
|---|---|---|
| 2,784,880 | 3/1957 | Pio .......................................... 198/834 |
| 2,872,023 | 2/1959 | Bechtel, Jr. . |
| 3,261,451 | 7/1966 | Roinestad . |
| 3,348,659 | 10/1967 | Roinestad ............................... 198/778 |
| 3,920,117 | 11/1975 | Roinestad . |
| 4,078,655 | 3/1978 | Roinestad . |
| 4,846,339 | 7/1989 | Roinestad . |
| 4,867,301 | 9/1989 | Roinestad et al. . |
| 5,139,135 | 8/1992 | Irwin et al. . |
| 5,141,099 | 8/1992 | Baumgarten . |
| 5,271,491 | 12/1993 | Irwin . |
| 5,423,416 | 6/1995 | Kucharski ............................... 198/848 |
| 5,501,319 | 3/1996 | Larson et al. ........................... 198/852 |
| 5,518,109 | 5/1996 | Dailey et al. . |
| 5,566,817 | 10/1996 | Meeker .................................... 198/848 |

*Primary Examiner*—Joseph E. Valenza
*Attorney, Agent, or Firm*—Burns, Doane, Swecker & Mathis, L.L.P.

[57] ABSTRACT

A wire conveyor belt includes a plurality of spaced, tractive rods disposed in succession and transversely with respect to a direction of travel of the belt, each rod having two ends. A plurality of rows of wickets are transversely disposed with respect to the direction of travel, and interconnect the succession of rods, each row of wickets including a plurality of links, each link connecting a rod with a following rod in the succession. The belt has a transport course including at least one course turn deviating in a direction selected from the group consisting of a left course turn and a right course turn. The belt in the course turn has an outside edge and an inside edge, and the belt has a straight transport course downstream of the course turn. The belt in the straight transport course has an outside edge corresponding to the outside edge of the belt in the course turn, and the belt in the straight transport course has an inside edge corresponding to the inside edge of the belt in the course turn. At least one sprocket engages the rod in the straight transport course downstream of the course turn at a sprocket-engagement location on the belt inward of the outside edge. Tension in the belt is transferred so as to alleviate wicket fatigue failure. The tension is transferred by either: a) a split between adjacent links in each row of wickets, the split in each row being located between links of each row immediately adjacent the sprocket-engagement location on the belt; b) a tension-transferring combination of sprockets made up of a pair of sprockets including the sprocket described above, engaging the rods at immediately adjacent sprocket-engagement locations; c) at least one tension-transferring generally U-shaped tension link adjacent each row of wickets and connecting one rod in the succession with a following rod in the succession, the tension link being positioned between the outside edge and an outside end of a respective wicket row, wherein a base portion of the U-shaped tension link engages one rod in the succession and two leg portions of the U-shaped tension link engage an adjacent rod in the succession and d) a combination thereof. The present invention also relates to a process for transferring tension in a wire conveyor belt utilizing the features set forth above.

14 Claims, 7 Drawing Sheets

WIRE CONVEYOR BELT WITH TENSION TRANSFER

BACKGROUND OF THE INVENTION

1. Field of the Invention

The present invention relates to the field of wire conveyor belts.

2. Description of the Background Art

Flat wire conveyor belts are well-known in the art, one example of which is described in U.S. Pat. No. 2,872,023 to Bechtel, Jr. Such belts include a plurality of tractive wickets (sometimes referred to in the prior art as "pickets") which are links formed to provide an array of longitudinally-extending tractive members having slots therethrough. Cross rods extend through the slots for slidably interconnecting the wickets. The previously-mentioned Bechtel, Jr. patent describes placement of slots in the wire to allow the belt to operate around right or left-hand course turns.

U.S. Pat. No. 3,261,451 to Roinestad discloses utilization of a tapered pin slot on flat wire conveyor belts. The taper allows the rod to move freely when the belt collapses in a turn.

U.S. Pat. No. 4,846,339 to Roinestad discloses belts with wickets of differing pitch to transfer belt tension or load, so as to decrease flexure and resultant fatigue failure of the wickets.

U.S. Pat. No. 5,271,491 to Irwin discloses utilization of wicket links having different pitch for providing a bi-directional, short radius turn, conveyor belt.

There remains a need in the art for improvements in wire conveyor belts.

SUMMARY OF THE INVENTION

In accordance with the present invention, a wire conveyor belt and process for transferring tension in same utilizes a plurality of spaced, tractive rods disposed in succession and transversely with respect to a direction of travel of the belt, each rod having two ends. A plurality of rows of wickets are transversely disposed with respect to the direction of travel, and interconnect the succession of rods, each row of wickets comprising a plurality of links, each link connecting a rod with a following rod in the succession. The belt has a transport course including at least one course turn deviating in a direction selected from the group consisting of a left course turn and a right course turn. The belt in the course turn has an outside edge and an inside edge. The belt has a straight transport course downstream of the course turn. The belt in the straight transport course has an outside edge corresponding to the outside edge of the belt in the course turn, and the belt in the straight transport course has an inside edge corresponding to the inside edge of the belt in the course turn. At least one sprocket engages the rod in the straight transport course downstream of the course turn at a sprocket-engagement location on the belt inward of the outside edge. Tension in the belt is transferred so as to alleviate wicket fatigue failure. The tension is transferred by either: a) a split between adjacent links in each row of wickets, the split in each row being located between links of each row immediately adjacent the sprocket-engagement location on the belt; b) a tension-transferring combination of sprockets made up of a pair of sprockets including the at least one sprocket described above, engaging the rods at immediately adjacent sprocket-engagement locations; c) at least one tension-transferring generally U-shaped tension link adjacent each row of wickets and connecting one rod in the succession with a following rod in the succession, the tension link being positioned between the outside edge and an outside end of a respective wicket row, wherein a base portion of the U-shaped tension link engages one rod in the succession and two leg portions of the U-shaped tension link engage an adjacent rod in the succession; and d) a combination thereof.

DETAILED DESCRIPTION OF THE PREFERRED EMBODIMENTS

Figure 1:
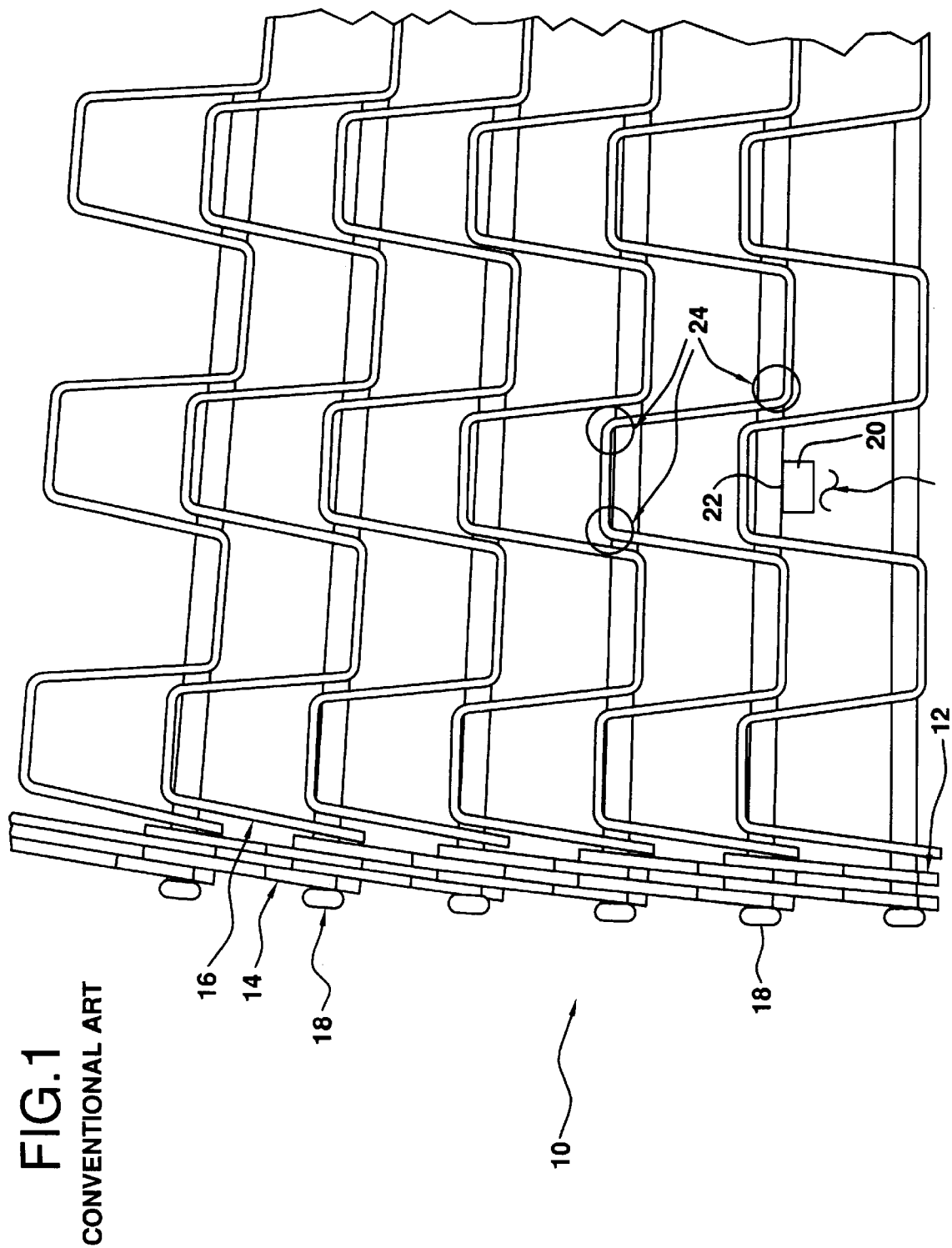
FIG. 1 is a top elevational view, partly schematic and with portions broken away, of a segment of a conventional belt to which the invention can be applied.

With reference to FIG. 1, when a flat wire conveyor belt 10 is used in a spiral system or turn, tension is carried on the outside edge 12 of belt 10 by reinforcing bars 14. The wickets 16 on belt 10 are for product support, rather than taking a load. Rods 18 are utilized to hold the components of belt 10 together, and to transmit drive forces to the outside edge 12 of belt 10.

In a straight run, such as the infeed and discharge areas of a spiral system, the outside reinforcing bars 14 have little if any effect on the function of belt 10. A sprocket 20 tooth, which engages rods 18 in a straight transport course downstream of a course turn, causes rod 18 to deflect at sprocket 20, releasing tension from the outside edge 12 of belt 10. This causes wickets 16, whose purpose is for product support, to now take the tension of the belt 10. The sprocket-engagement area 22 of rod 18 takes tension from sprocket 20 and applies it to adjacent wicket areas 24 to cause wicket fatigue and breakage at one or more of wicket areas 24 where rod 18 meets wickets 16.

Fatigue breakage at one or more of wicket areas 24 of a flat wire conveyor belt is a function of the number of cycles that a particular area 24 is flexed.

Failure of a wicket can be accelerated by adding tension thereto. Two areas where a flat wire conveyor belt such as shown in FIG. 1 has the most tension is on the edge 12 of belt 10 and in the sprocket-engagement area 22 of belt 10. When rod 18 flexes to distribute the tension or load, wicket 16 also is flexed until tension is transferred from the edge 12 to the engagement location of sprocket 20. Without being bound to any particular theory, it is believed that such flexing causes wicket breakage.

FIGS. 2A–2D show conveyor belts in accordance with one set of embodiments of the present invention.

Figure 2A:
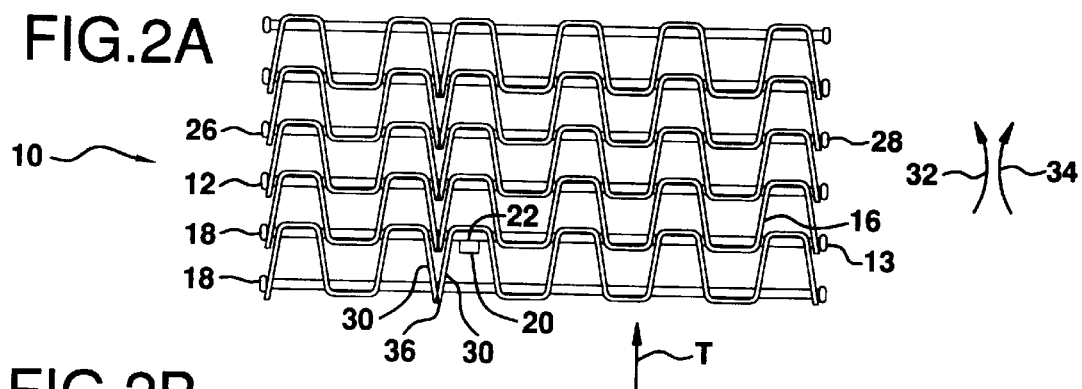
FIGS. 2A–2D are elevational views of belt segments in accordance with one set of embodiments of the present invention.

With reference to FIG. 2A, a flat wire conveyor belt 10 in accordance with the present invention includes a plurality of spaced tractive rods 18 disposed in succession and transversely with respect to a direction of travel T as represented by arrow T of belt 10, each rod 18 having two ends 26 and 28.

Belt 10 includes a plurality of rows of wickets 16 transversely disposed with respect to the direction of travel T, and interconnecting the succession of rods 18. Each row of wickets 16 is comprised of a plurality of links 30, each link connecting a rod 18 with a following rod in the succession.

Belt 10 has a transport course including at least one course turn deviating in a direction selected from the group consisting of a left course turn, as schematically illustrated by arrow 32, and a right course turn, as schematically illustrated by arrow 34.

When belt 10 is in a right course turn as represented by arrow 34, belt 10 has an outside edge 12 and an inside edge 13.

In accordance with the present invention, belt 10 has a straight transport course, also exemplified by arrow T, which is downstream of a left or right course turn of belt 10, as respectively exemplified by arrows 32 and 34.

Belt 10, in the straight transport course exemplified by arrow T, has an outside edge 12 corresponding to the outside edge of the belt in course turn 34, and an inside edge 13 corresponding to the inside edge of the belt in the course turn.

Sprocket means 20 for moving belt 10 engages rod 18 in the straight transport course downstream of a course turn, at a sprocket-engagement location 22 on belt 10 inward of the outside edge 12.

The present invention provides means for transferring tension in belt 10 so as to alleviate wicket fatigue failure. The tension-transferring means of the present invention can be in the form of a split 36 between links 30 in each row of wickets 16, wherein the split 36 in each row is located between links 30 of each row immediately adjacent the sprocket-engagement location 22 on belt 10.

Figure 2B:
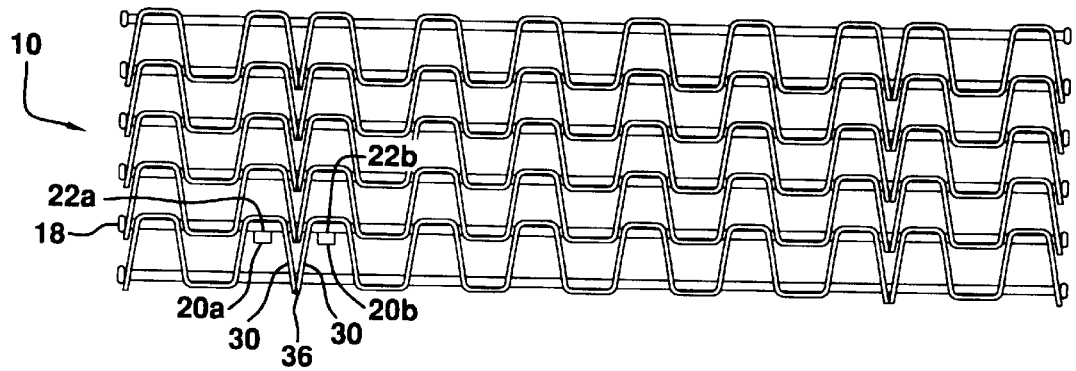
Figure 2C:
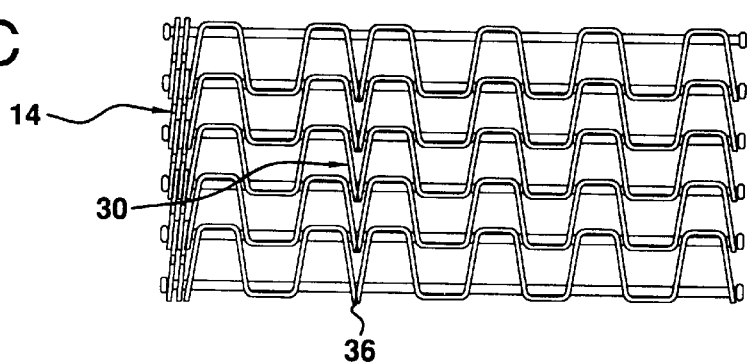
Figure 2D:
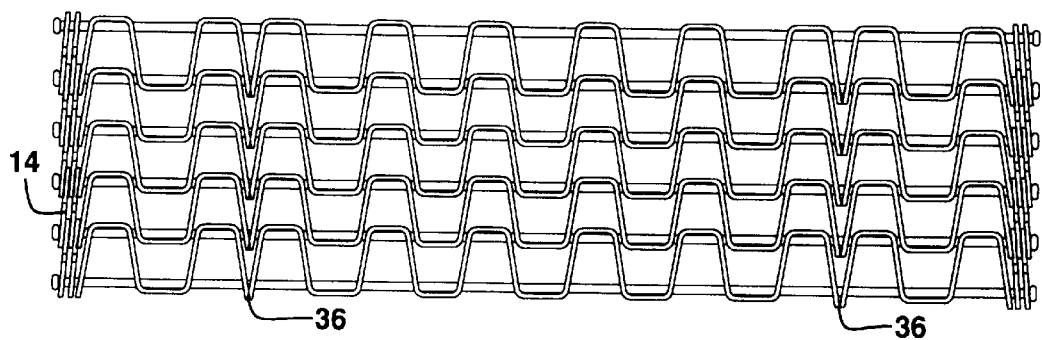

In accordance with another embodiment, the tension-transferring means is comprised of a pair of sprockets 20a and 20b, which engage rods 18 at immediately adjacent sprocket-engagement locations 22a and 22b on belt 10, as shown in FIG. 2B. This plural sprocket tension-transferring means can be combined with a split 36 between adjacent links 30, as shown in FIG. 2B, or the tension transferring means can be the plural sprocket embodiment alone, without split wicket links, as shown in FIGS. 3A–3D.

Figure 3A:
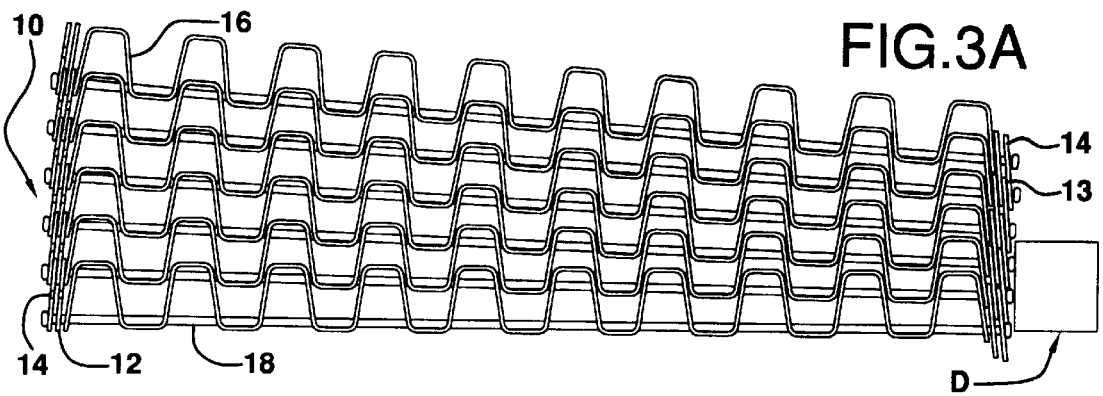
FIGS. 3A–3D are elevational views showing belt segments in accordance with another set of embodiments of the present invention.

FIGS. 3A–3D show flat wire conveyor systems in accordance with one set of embodiments of the present invention. FIG. 3A shows a segment of a flat wire conveyor belt 10 in a course turn of a spiral system driven by a drive bar D on the inside of the turn. Belt 10 of FIG. 3A includes an outside edge 12, and inside edge 13, reinforcing bars 14 on both outside edge 12 and inside edge 13, wickets 16 and rods 18.

Figure 3B:
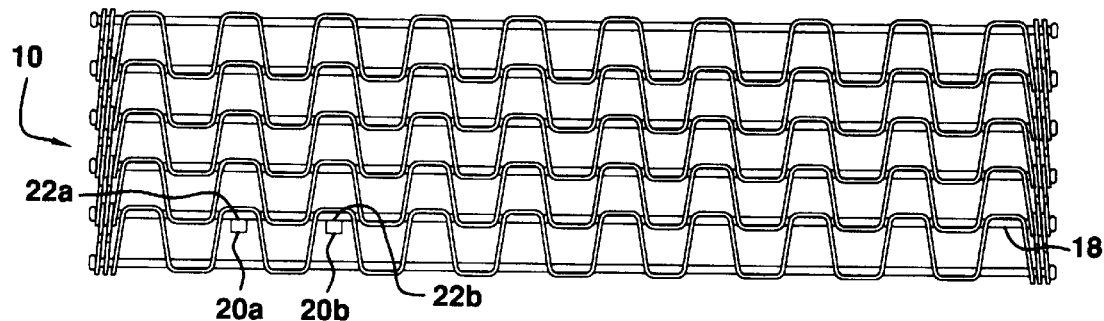

FIG. 3B shows a segment of the belt 10 of FIG. 1A, but in a straight transport course downstream of the course turn shown in FIG. 3A.

Figure 3C:
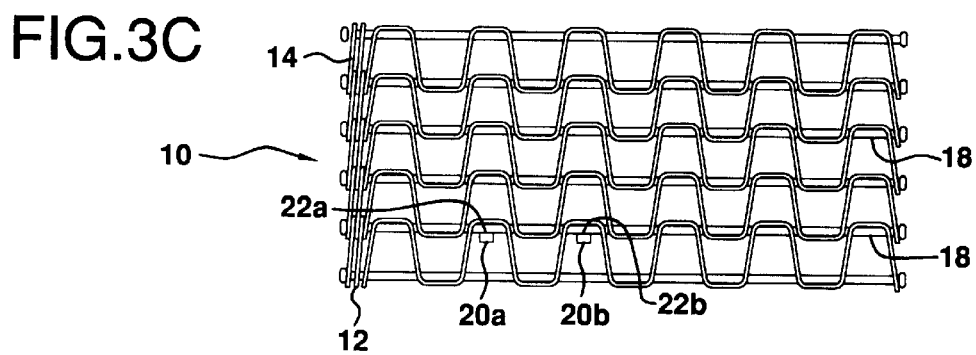

FIG. 3C shows a segment of another belt 10 having reinforcing bars 14 on the outside edge 12 only of the belt.

Figure 3D:
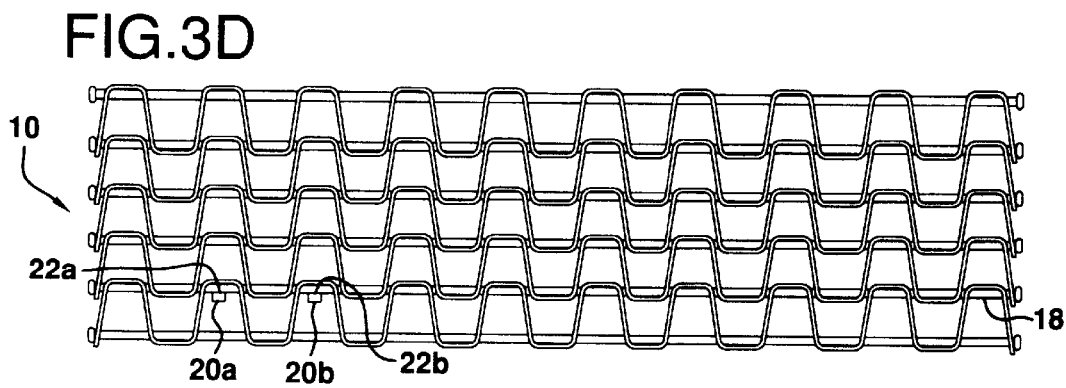

FIG. 3D shows a segment of still another belt 10 having no reinforcing bars on either edge thereof.

FIGS. 3B, 3C and 3D show tension-transferring means in accordance with the present invention wherein the sprocket means comprises a pair of sprockets 20a and 20b engaging rods 18 at immediately adjacent sprocket-engagement locations 22a and 22b.

In embodiments of the present invention where the tension-transferring means includes a split 36 between adjacent links 30, the belt can be provided with wicket-separating means, each of which is connected to at least one corresponding rod and positioned within the split 36 between links 30. The wicket separating means can comprise at least one reinforcing bar positioned within each split between links, each reinforcing bar connecting one rod with a following rod in the succession.

Figure 4:
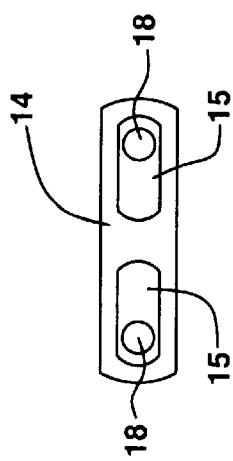
FIG. 4 is a side elevational view of a reinforcing bar which can be utilized with the present invention.

In FIG. 4, a reinforcing bar 14 is shown in side elevational view, illustrating slots 15 therein for receiving adjacent rods 18.

Figure 5:
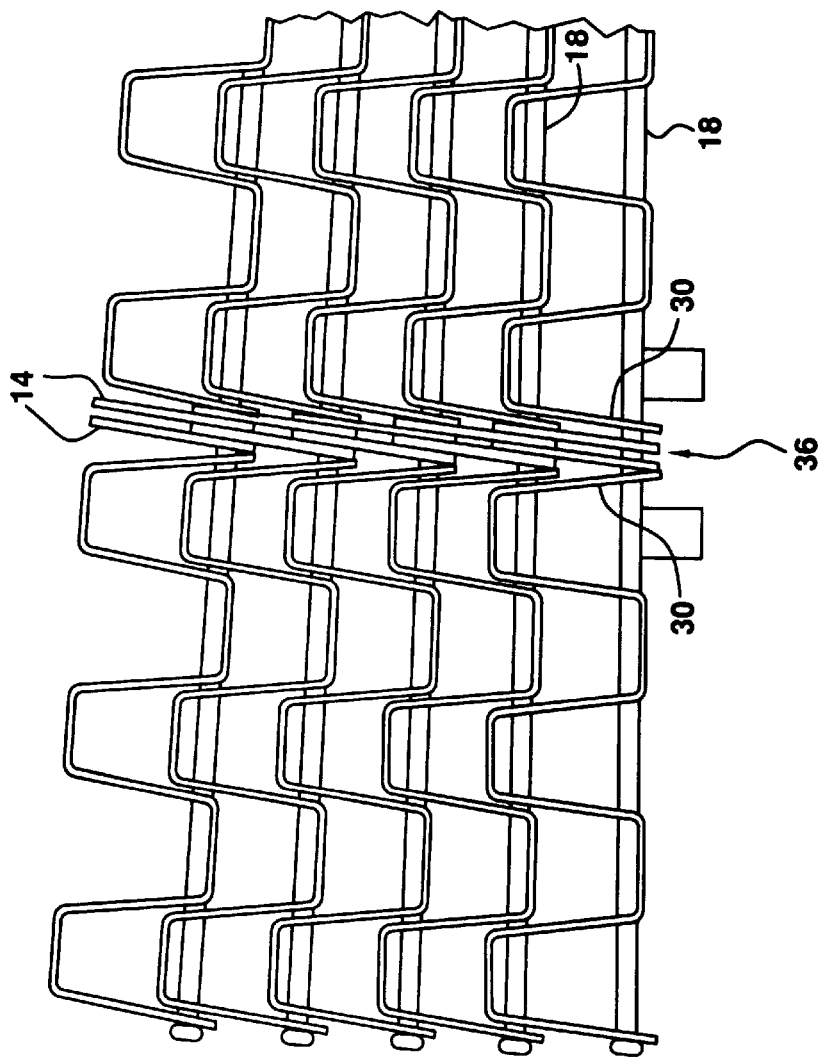
FIG. 5 is an elevational view, partly schematic and with portions broken away, of a belt segment showing another embodiment of the invention.
Figure 6A:
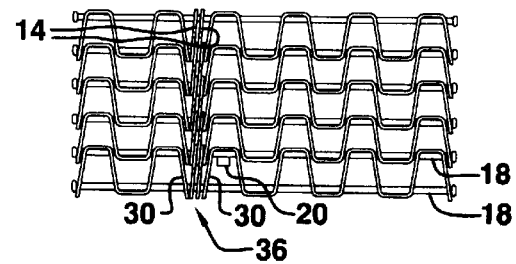
FIGS. 6A and 6B are elevational views showing a belt segment utilizing still another set of embodiments of the present invention.
Figure 6B:
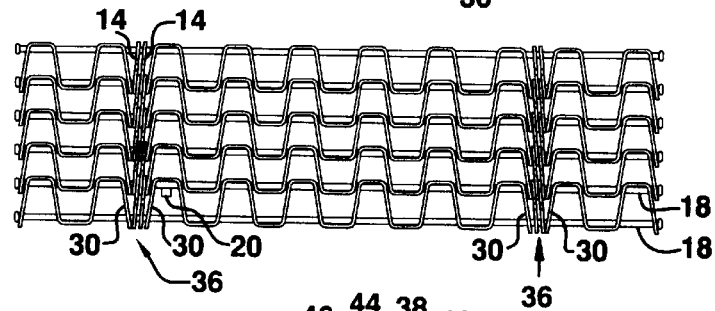

In the embodiment shown in FIGS. 5, 6A and 6B, a pair of reinforcing bars 14 is positioned within each split 36 between links 30, with each reinforcing bar 14 connecting one rod 18 with a following rod in the succession.

In the embodiments shown in FIGS. 7A–7D, the wicket-separating means comprises a tension link 38 positioned within each split 36 between wicket links 30, each tension link 38 connecting a corresponding rod 18 with a following rod in a succession. Tension links 38 are formed of heavier gauge material than the material from which the wickets are formed, and preferably have a thickness which is about two to about four times thicker than the wicket thickness.

Each tension link 38 is a generally U-shaped member, wherein a base portion 44 of the U-shaped tension link 38 contacts one rod 18, and two leg portions 46 of the U-shaped tension link 38 contacts an adjacent rod 18 in the succession of rods. See FIG. 7A.

Figure 7A:
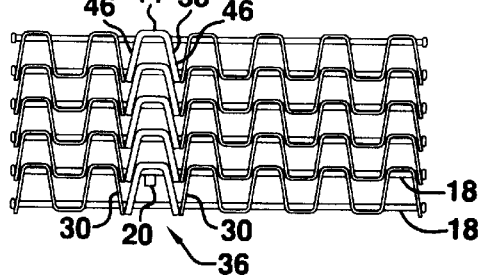
FIGS. 7A–7D are elevational views showing a belt segment utilizing yet another set of embodiments of the present invention.
Figure 7B:
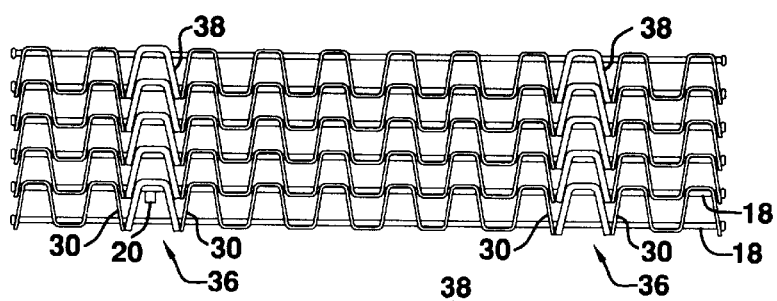
Figure 7C:
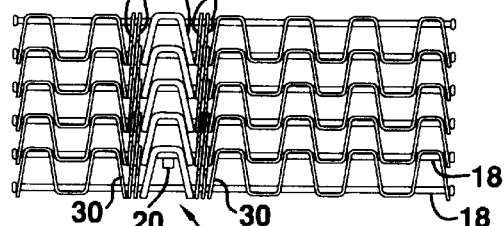
Figure 7D:
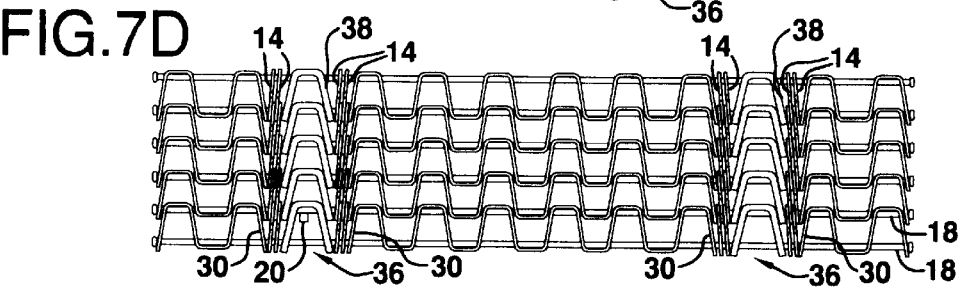

In the embodiments shown in FIGS. 7C and 7D, the wicket-separating means includes a tension link 38 between two pairs of reinforcing bars 14.

Figure 8A:
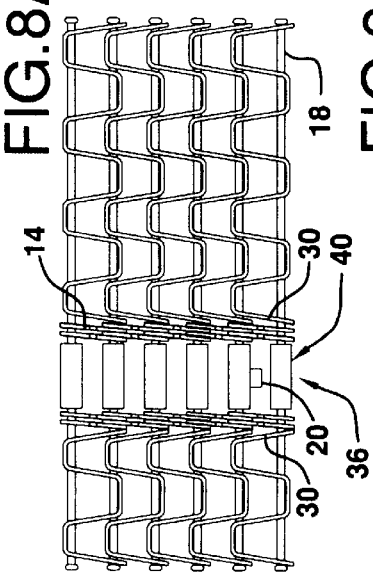
FIGS. 8A and 8B are elevational views showing belt segments with yet a further set of embodiments of the present invention.
Figure 8B:
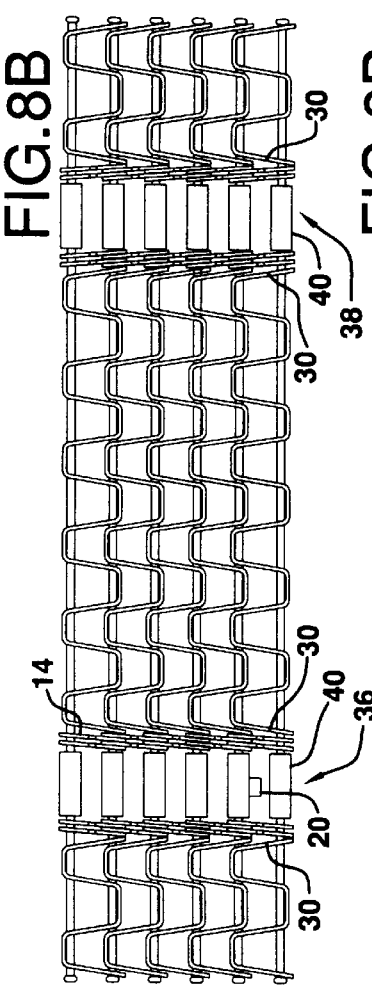

FIGS. 8A and 8B show wicket-separating means which includes a pipe or tubular member 40 surrounding a corresponding portion of each rod 18 and located within the split 36 between links 30. In accordance with this embodiment, the tubular member 40 engages the sprocket 20. If desired, one or more reinforcing bars 14, or pairs thereof, can be provided adjacent tubular members 40 within split 36.

Figure 9A:
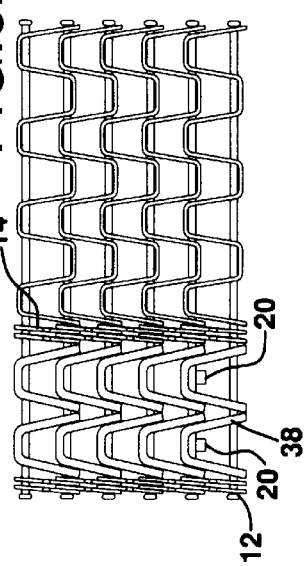
FIGS. 9A–9D are elevational views of belt segments with still a further set of embodiments of the present invention.
Figure 9B:
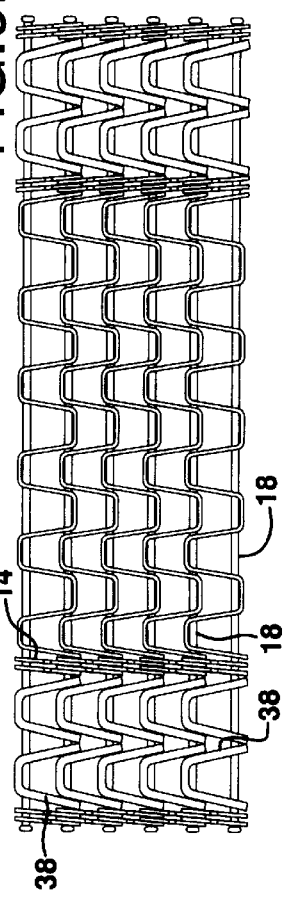
Figure 9C:
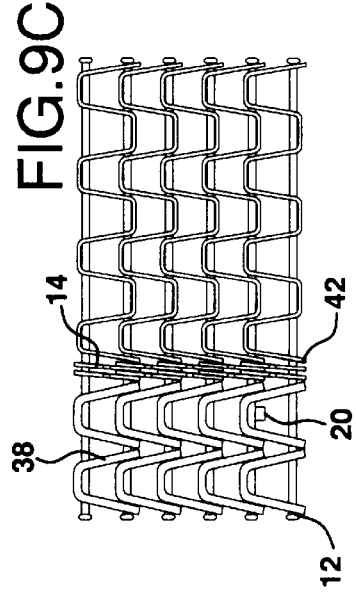
Figure 9D:
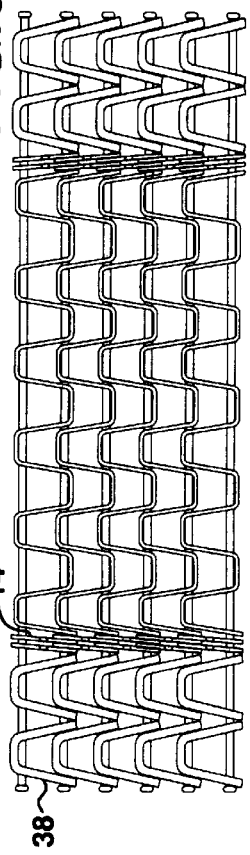

FIGS. 9A–9D show various embodiments of the present invention in which the tension-transferring means comprises at least one tension link positioned between the outside edge 12 of belt 10 and an outside end 42 of a respective wicket row. In accordance with this embodiment, one or more reinforcing bars 14, or pairs thereof, can optionally be provided between each tension link 38 and the adjacent outside end 42 of a respective wicket row, as shown in FIGS. 9C and 9D. Alternatively, at least one reinforcing bar 14 or pair thereof can be positioned on each side of a respective tension link, or on each side of a pair of tension links 38 as shown in FIGS. 9A and 9B.

Figure 10:
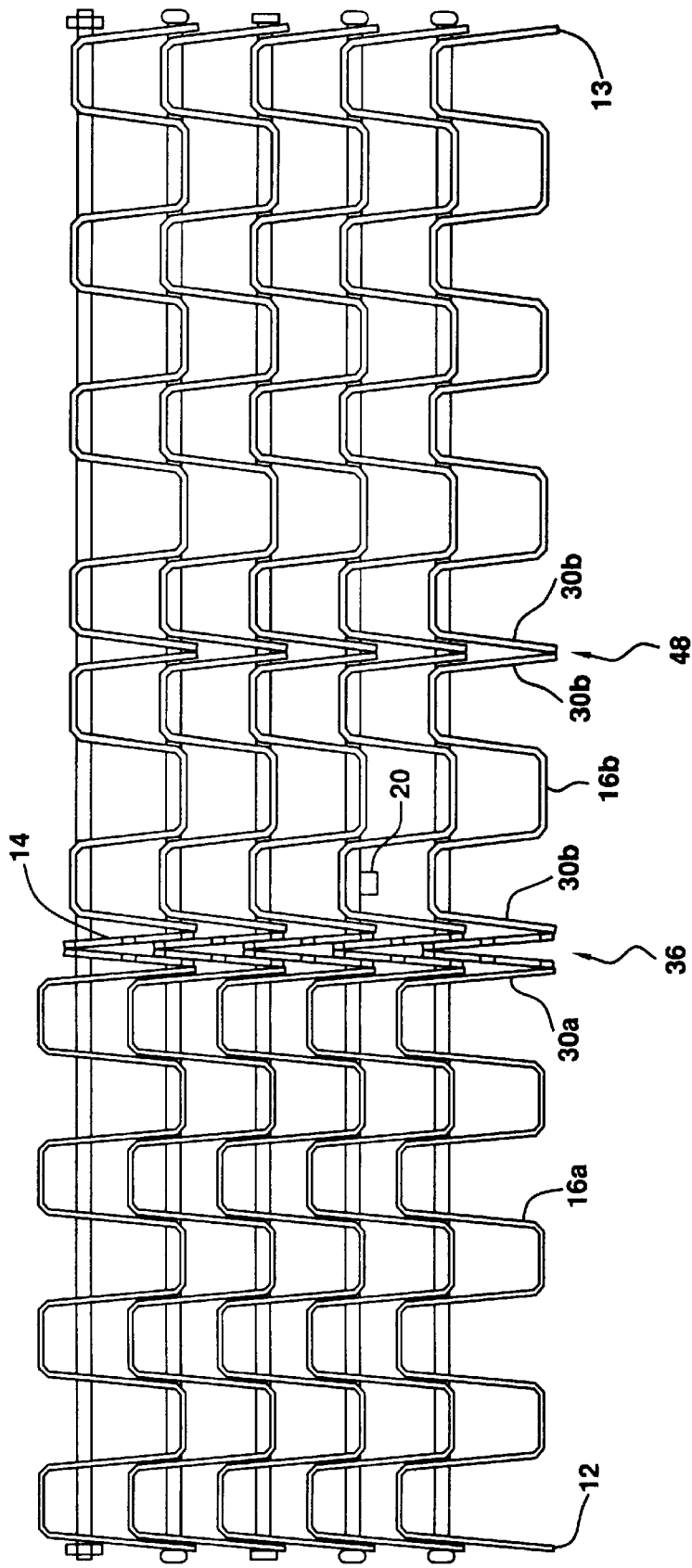
FIG. 10 is an elevational view of a belt segment with yet another embodiment of the present invention.

FIG. 10 shows an embodiment of the invention including a split 36 between adjacent links 30a and 30b, wherein wickets 16a between split 36 and outside edge 12 have a greater pitch than wickets 16b between split 36 and inside edge 13. If desired, one or more reinforcing links 14, or pairs thereof, can be positioned within split 36 between adjacent links 30a and 30b. In the embodiment shown in FIG. 10, a second split 48 is provided between one pair of adjacent links 30b in each row of wickets, split 48 being located in each row of wickets between split 36 and inside edge 13.

The embodiments shown in 2B, 2D, 6B, 7B, 7D, 8B, 9B and 9D differ from the embodiment shown in FIG. 10, in that they further include a second split 36 between adjacent links in each row of wickets, the second split 36 in each row being located between links of each row on an opposite side of the belt from the first split, so that the belt can be utilized with right and left course turns, and/or the belt can be flipped over after a period of use, to position the second split immediately adjacent the sprocket means, for extending the life of the belt.

The present invention is also applicable to a process for transferring tension in a wire conveyor belt utilizing the features set forth herein.

Because many modifications, variations and changes in detail may be made to the described embodiments, it is intended that all matter in the foregoing description and shown in the accompanying drawings be interpreted as illustrative and not in a limiting sense.

We claim:

1. A wire conveyor belt for use in a transport course including a straight transport course and at least one course turn deviating in a direction selected from the group consisting of a left course turn and a right course turn, said belt comprising:

a plurality of spaced, tractive rods disposed in succession and transversely with respect to a direction of travel of said belt, each rod having two ends;

a plurality of rows of tractive flat wire wickets transversely disposed with respect to said direction of travel, and interconnecting the succession of rods, each wicket row being a continuous flat wire link extending across each row, each flat wire link connecting a rod with a following rod in the succession;

wherein said belt in said straight transport course has an outside edge corresponding to said outside edge of said belt in said at least one course turn, and said belt in said straight transport course has an inside edge corresponding to said inside edge of said at least one course turn; and means for transferring tension in said belt away from said wickets during a transition between the straight course and the at least one course turn so as to substantially reduce wicket fatigue failure, said tension-transferring means comprising a plurality of individual, abutting, and generally U-shaped tension links adjacent each row of wickets and connecting one rod in the succession with a following rod in the succession, said tension links being positioned adjacent said outside edge, between said outside edge and an outside end of a respective wicket row, wherein a base portion of each U-shaped tension link engages one rod in the succession, and two leg portions of each U-shaped tension link engage an adjacent rod in the succession, said tension links having a substantially fully expanded condition in the straight transport course;

wherein tension in said belt is distributed over said wickets and said tension links when said belt is in the straight transport course, said wickets having a first degree of tension distributed uniformly throughout each continuous link;

wherein a majority of tension in said belt is transferred to said tension links and away from said wickets in the transition between the straight transport course and the at least one course turn, said tension links extending over a predetermined width of said outside edge of said belt, said predetermined width being chosen so as to transfer sufficient tension to the tension links such that tension in said wickets does not exceed the first degree of tension.

2. A process for transferring tension in a wire conveyor belt, comprising:

providing a wire conveyor belt comprising a plurality of spaced, tractive rods disposed in succession and transversely with respect to a direction of travel of said belt, each rod having two ends, a plurality of rows of tractive flat wire wickets transversely disposed with respect to said direction of travel, and interconnecting the succession of rods, each wicket row being a continuous flat wire link extending across each row, each flat wire link connecting a rod with a following rod in the succession, wherein said belt has a transport course including a straight transport course and at least one course turn deviating in a direction selected from the group consisting of a left course turn and a right course turn, wherein said belt in said at least one course turn has an outside edge and an inside edge, and wherein said belt in said straight transport course has an outside edge corresponding to said outside edge of said belt in said at least one course turn, and said belt in said straight transport course has an inside edge corresponding to said inside edge of said belt in said at least one course turn;

transferring tension in said belt by providing tension-transferring means comprising a plurality of individual, abutting, and generally U-shaped tension links adjacent each row of wickets and connecting one rod in the succession with a following rod in the succession, said tension links being positioned adjacent said outside edge, between said outside edge and an outside end of a respective wicket row, wherein a base portion of each U-shaped tension link engages one rod in the succession, and two leg portions of each U-shaped tension link engage an adjacent road in the succession, wherein the tension-transferring means transfers tension away from said wickets during a transition between said straight transport course and said at least one course turn so as to substantially reduce wicket fatigue failure;

wherein tension in said belt is distributed over said wickets and said tension links when said belt is in the straight transport course, said wickets having a first degree of tension distributed uniformly throughout each continuous link;

wherein said tension transferring step includes transferring a majority of tension in said belt to said tension links and away from said wickets in the transition between the straight transport course and the at least one course turn by extending said tension links over a predetermined width of said outside edge of said belt, said predetermined width being chosen so as to transfer sufficient tension to the tension links such that tension in said wickets does not exceed the first degree of tension.

3. The belt of claim 1 including said plurality of abutting generally U-shaped tension links, further comprising a plurality of adjacent reinforcing bars which are positioned adjacent said tension links.

4. The process of claim 2 wherein said belt includes said plurality of abutting generally U-shaped tension links, the belt further comprising a plurality of adjacent reinforcing bars which are positioned adjacent said tension links.

5. The belt of claim 1 wherein said wickets are formed of a material having a first weight and said tension links are formed of a material having a second weight, said second weight being greater than said first weight.

6. The belt of claim 1 further comprising a plurality of reinforcing bars provided between said tension links and said outside edge of said belt.

7. The belt of claim 1 further comprising a plurality of reinforcing bars provided between said tension links and said wickets.

8. The process of claim 2 wherein said wickets are formed of a material having a first weight and said tension links are formed of a material having a second weight, said second weight being heavier than said first weight.

9. The process of claim 2 further comprising providing a plurality of reinforcing bars between said tension links and said outside edge of said belt.

10. The process of claim 2 further comprising providing a plurality of reinforcing bars between said tension links and said wickets.

11. A conveyor belt system comprising:

a conveyor belt including:

a plurality of spaced, tractive rods disposed in succession and transversely with respect to a direction of travel of said belt, each rod having two ends;

a plurality of rows of tractive flat wire wickets transversely disposed with respect to said direction of travel, and interconnecting the succession of rods, each wicket row being a continuous flat wire link extending across each row, each flat wire link connecting a rod with a following rod in the succession; and a plurality of individual, abutting, and generally U-shaped tension links adjacent each row of wickets and connecting one rod in the succession with a following rod in the succession;

said conveyor belt having a transport course including a straight transport course and at least one course turn deviating in a direction selected from the group consisting of a left course turn and a right course turn, said belt in said at least one course turn having an outside edge and an inside edge, said belt in said straight transport course having an outside edge corresponding to said outside edge of said belt in said at least one course turn, and said belt in said straight transport course having an inside edge corresponding to said inside edge of said at least one course turn; and sprocket means for engaging said rods at a sprocket-engagement location on said belt inward of said outside edge and moving said belt; and wherein said tension links define tension-transferring means positioned adjacent said outside edge, between said outside edge and an outside end of a respective wicket row;

wherein tension in said belt is distributed over said wickets and said tension links when said belt is in the straight transport course, said wickets having a first degree of tension distributed uniformly throughout each continuous link; and wherein a majority of tension in said belt is transferred to said tension links and away from said wickets in the transition between the straight transport course and the at least one course turn, said tension links extending over a predetermined width of said outside edge of said belt, said predetermined width being chosen so as to transfer sufficient tension to the tension links such that tension in said wickets does not exceed the first degree of tension.

12. The conveyor system of claim 11 wherein said wickets are formed of a material having a first weight and said tension links are formed of a material having a second weight, said second weight being greater than said first weight.

13. The conveyor system of claim 11 further comprising a plurality of reinforcing bars provided between said tension links and said outside edge of said belt.

14. The conveyor system of claim 11 further comprising a plurality of reinforcing bars provided between said tension links and said wickets.

* * * * *